(12) United States Patent
Yamaguchi et al.

(10) Patent No.: US 10,444,426 B2
(45) Date of Patent: Oct. 15, 2019

(54) INFORMATION PROCESSING APPARATUS

(71) Applicant: Fujitsu Client Computing Limited, Kanagawa (JP)

(72) Inventors: Goki Yamaguchi, Kawasaki (JP); Yoshiyuki Sando, Kawasaki (JP); Yasufumi Yamamoto, Kawasaki (JP)

(73) Assignee: Fujitsu Client Computing Limited, Kanagawa (JP)

( * ) Notice: Subject to any disclaimer, the term of this patent is extended or adjusted under 35 U.S.C. 154(b) by 132 days.

(21) Appl. No.: 15/238,800

(22) Filed: Aug. 17, 2016

(65) Prior Publication Data

US 2017/0068035 A1    Mar. 9, 2017

(30) Foreign Application Priority Data

Sep. 9, 2015  (JP) ................ 2015-177277

(51) Int. Cl.
| | | |
|---|---|---|
| *F21V 8/00* | (2006.01) | |
| *G06F 1/16* | (2006.01) | |
| *H04W 88/02* | (2009.01) | |
| *H01Q 1/22* | (2006.01) | |

(52) U.S. Cl.
CPC .......... *G02B 6/009* (2013.01); *G02B 6/0023* (2013.01); *G02B 6/0083* (2013.01); *G02B 6/0088* (2013.01); *G02B 6/0091* (2013.01); *G02B 6/0093* (2013.01); *G06F 1/1656* (2013.01); *G06F 1/1698* (2013.01); *H01Q 1/2266* (2013.01); *H01Q 1/2291* (2013.01); *H04W 88/02* (2013.01)

(58) Field of Classification Search
CPC .... G02B 6/009; G02B 6/0023; G02B 6/0088; H04W 88/02; G06F 1/1656
See application file for complete search history.

(56) References Cited

U.S. PATENT DOCUMENTS

2012/0329526 A1\* 12/2012 Song ............... G06F 1/1643
                                                   455/566
2017/0006143 A1\* 1/2017 Yang .............. H04M 1/0249

FOREIGN PATENT DOCUMENTS

| JP | 2008-160511 A | 7/2008 |
|---|---|---|
| JP | 2010-193219 | 9/2010 |
| JP | 2011-129536 A | 6/2011 |
| JP | 2012-069311 A | 4/2012 |

(Continued)

OTHER PUBLICATIONS

Decision to Grant in counterpart Japanese Patent Application No. 2015-177277 dated Jan. 16, 2019 (4 pages).

(Continued)

*Primary Examiner* — Anabel Ton
(74) *Attorney, Agent, or Firm* — Osha Liang LLP

(57) ABSTRACT

A front cover and a rear cover are engaged to form an internal space. An LED is mounted on a main board, and it is laid over an antenna within the space in a thickness direction of the front cover and the rear cover that are engaged. A light guiding member is provided on the side surface of the front cover and the rear cover that are engaged, and it receives the light, generated by the LED, and emits light to outside. A side shielding member and a back shielding member protrude from the front cover toward the optical path between the LED and the light guiding member so as to shield the optical path from the LED toward the light guiding member.

4 Claims, 19 Drawing Sheets

(56) References Cited

FOREIGN PATENT DOCUMENTS

JP          2013-55644 A     3/2013
JP          2013-168718      8/2013

OTHER PUBLICATIONS

Office Action in counterpart Japanese Patent Application No. 2015-177277 dated Nov. 20, 2018 (7 pages).

\* cited by examiner

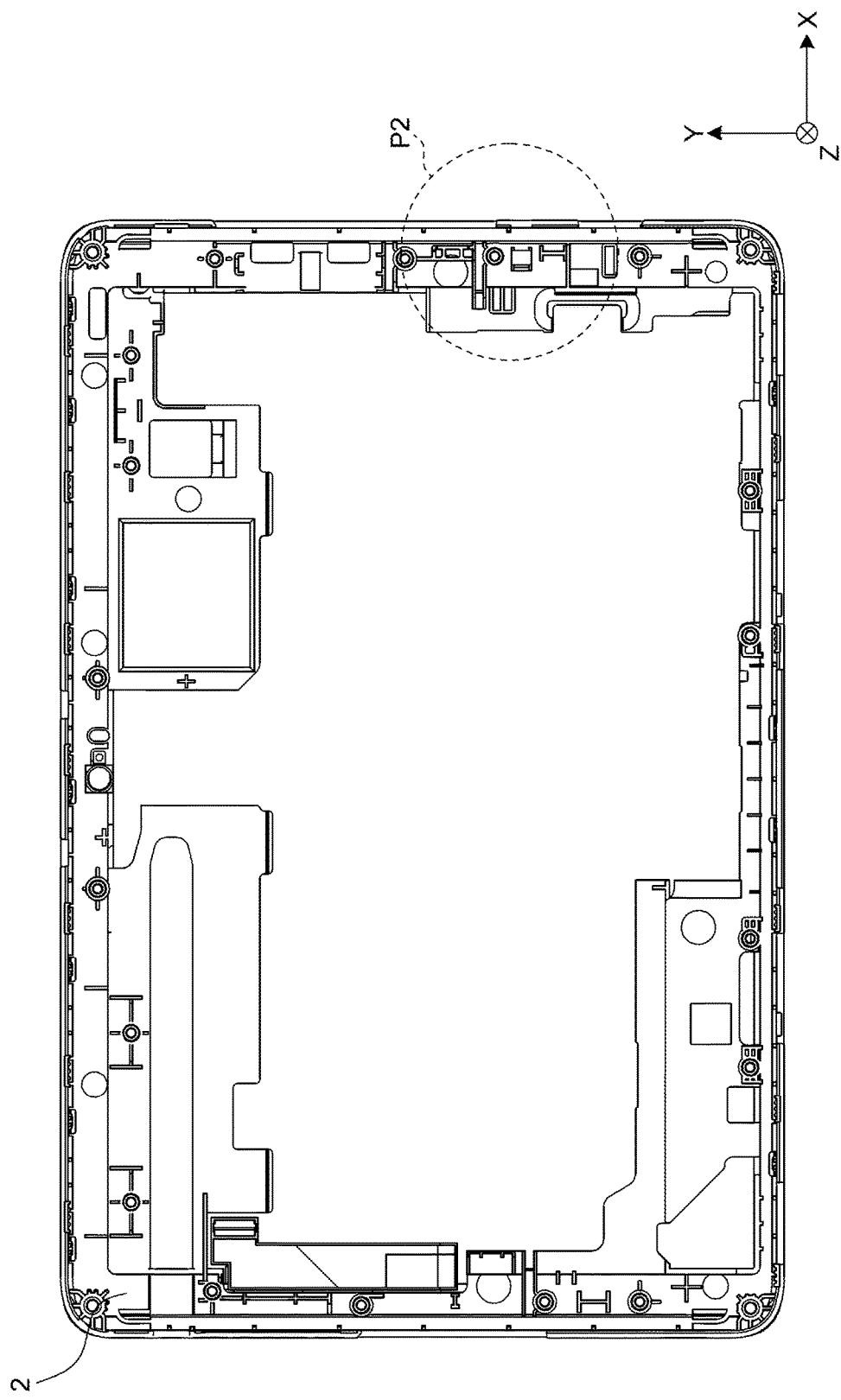

INFORMATION PROCESSING APPARATUS

CROSS-REFERENCE TO RELATED APPLICATION

This application is based upon and claims the benefit of priority of the prior Japanese Patent Application No. 2015-177277, filed on Sep. 9, 2015, the entire contents of which are incorporated herein by reference.

FIELD

The embodiments discussed herein are related to an information processing apparatus.

BACKGROUND

There is demand to manufacture thinner, lighter, and smaller tablet-type terminal devices. Therefore, for tablet-type terminal devices, the way of arranging internal components is an important matter. Particularly, as input/output (I/O) connectors are arranged on the side surface of a tablet-type terminal device, the arrangement of internal components is largely restricted in terms of size. Furthermore, some tablet-type terminal devices have a waterproof function; however, in such a case, as a waterproof cap is attached to an I/O connector, the arrangement of internal components is further restricted.

Furthermore, some connectors are provided with an indicator that indicates the connection state. For example, an indicator, indicating that the electric current is being applied, is sometimes provided in relation to a direct-current (DC) jack. As such an indicator often indicates the state of the corresponding connector, it is preferably provided on the side of the corresponding connector.

As technologies for installing an indicator in an information processing apparatus, there is a conventional technology in which the light of the LED, which is installed inside, is guided to outside by using a light guiding member, which also serves as an indicator, and a light shielding sheet is inserted between the LED and the chassis so that the light of the LED is prevented from leaking from the chassis cover.

[Patent Literature 1] Japanese Laid-open Patent Publication No. 2010-193219

However, if an indicator is provided on the side surface, it is difficult to provide the indicator at a desirable position due to the restriction on the installation area or the state of the board.

SUMMARY

According to an aspect of an embodiment, an information processing apparatus includes: a plate-like chassis that has an internal space; a light source that is laid over a different member within the space in a thickness direction of a plate form of the chassis; a light guiding member that is provided on a side surface of the chassis and that receives light, generated by the light source, and emits light to outside; and a shielding member that protrudes from the chassis toward an optical path between the light source and the light guiding member so as to shield the optical path.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is a plan view of a front cover;

DESCRIPTION OF EMBODIMENTS

Preferred embodiments of the present invention will be explained with reference to accompanying drawings. Furthermore, the information processing apparatus, disclosed in the subject application, is not limited to the following embodiment. Specifically, although an explanation is given below by using a tablet-type terminal device as an example of the information processing apparatus, it may be other thin information processing apparatuses, e.g., notebook personal computer (PC).

[a] First Embodiment

Figure 1:
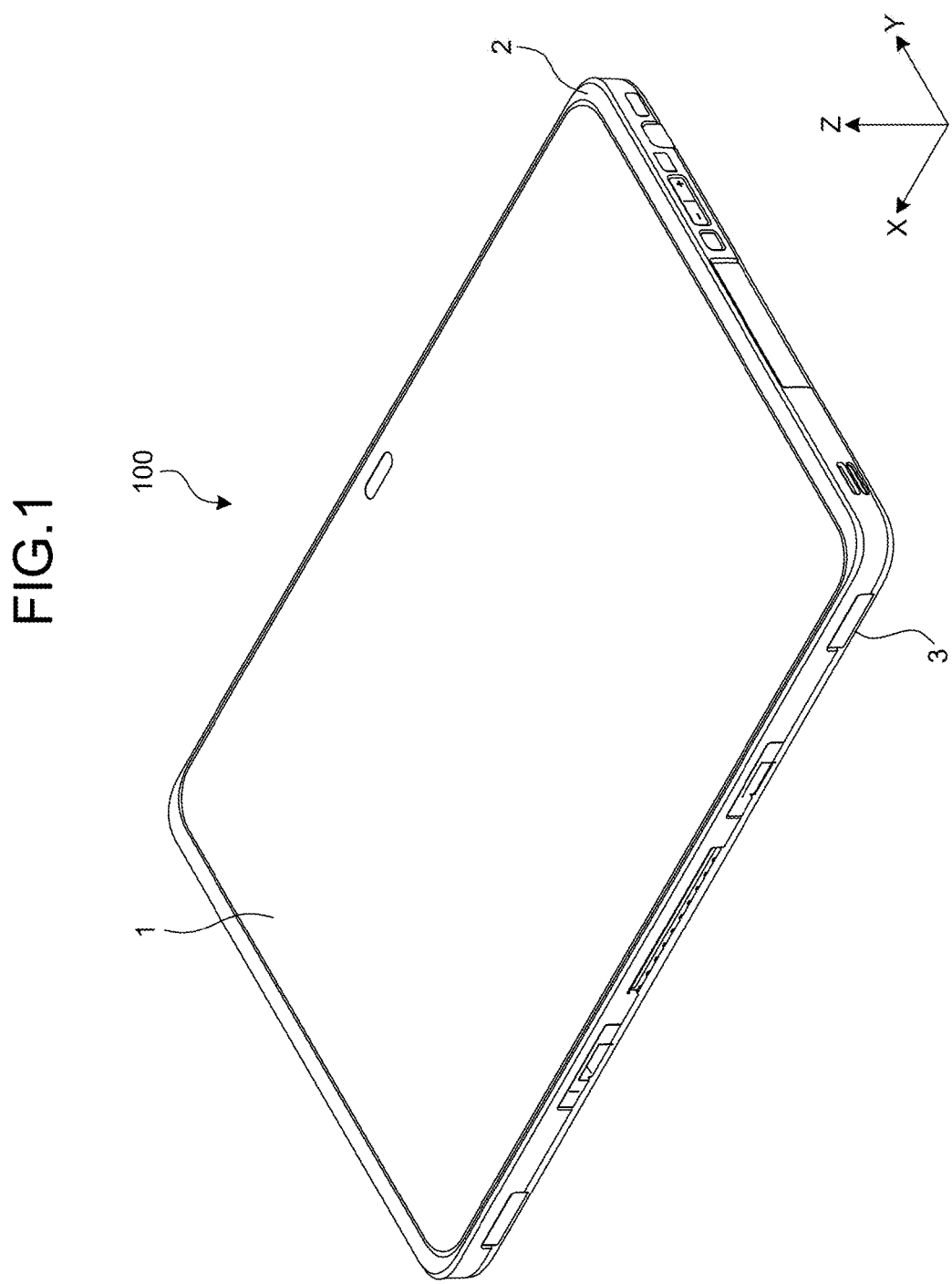
FIG. 1 is a perspective view of a tablet-type terminal device when viewed from the side of a touch panel.
Figure 2:
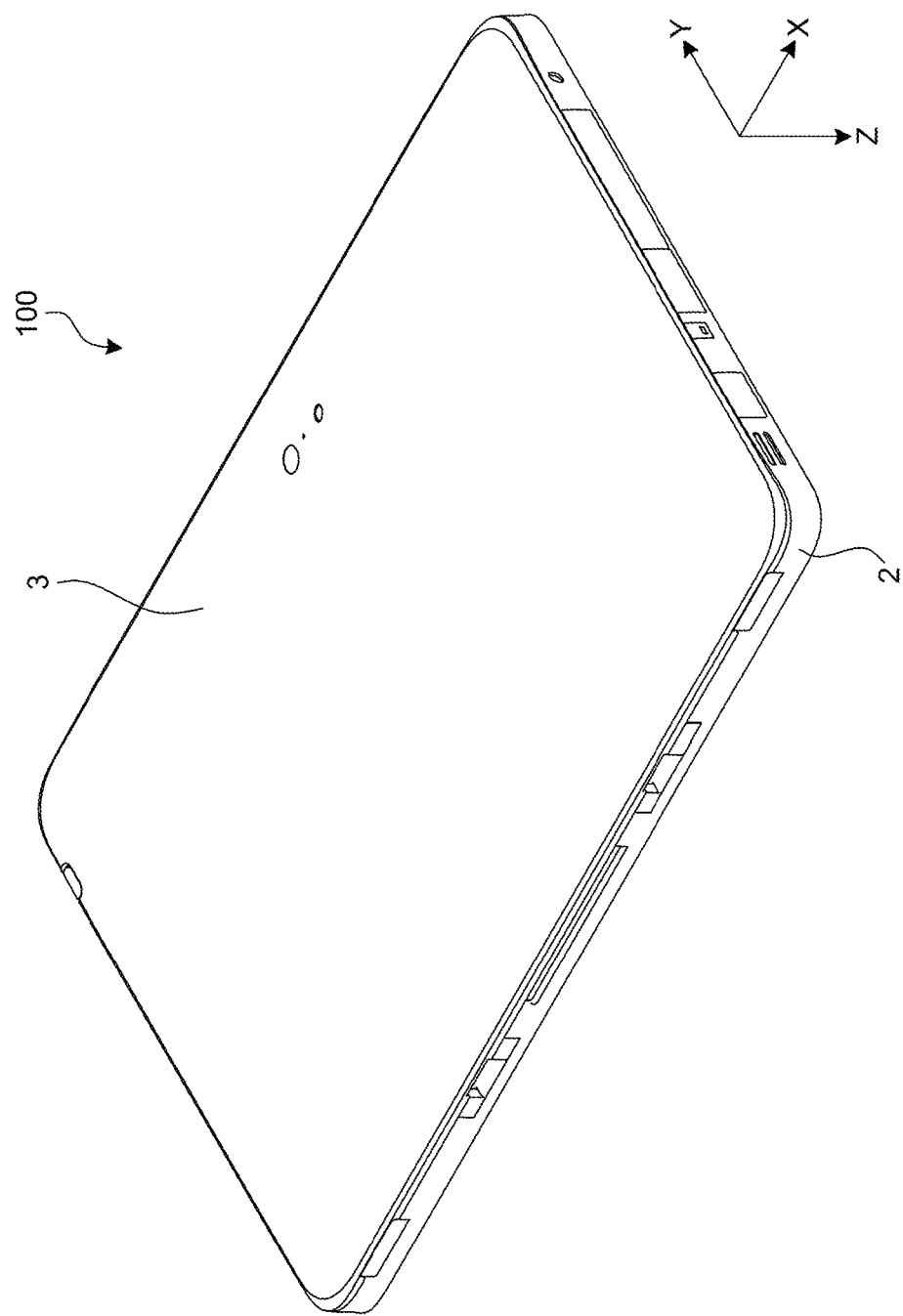
FIG. 2 is a perspective view of the tablet-type terminal device when viewed from the side of a rear cover.

FIG. 1 is a perspective view of a tablet-type terminal device when viewed from the side of a touch panel. Furthermore, FIG. 2 is a perspective view of the tablet-type terminal device when viewed from the side of a rear cover.

A tablet-type terminal device 100 includes a touch panel 1, a front cover 2, and a rear cover 3. The touch panel 1 is provided on the front cover 2. Furthermore, the front cover 2, on which the touch panel 1 is mounted, and the rear cover 3 are assembled to be engaged, thereby forming a single chassis that has an internal space.

Hereafter, the direction from the rear cover 3 toward the touch panel 1 is referred to as the Z direction, and the direction from the touch panel 1 toward the rear cover 3 as the opposite Z direction. Furthermore, the lateral direction of the tablet-type terminal device 100, which is the direction that is indicated by the arrow in FIG. 1, is referred to as the Y direction, and the opposite direction as the opposite Y direction. Furthermore, the longitudinal direction of the tablet-type terminal device 100, which is the direction that is indicated by the arrow in FIG. 1, is referred to as the X direction, and the opposite direction as the opposite X direction.

Figure 3:
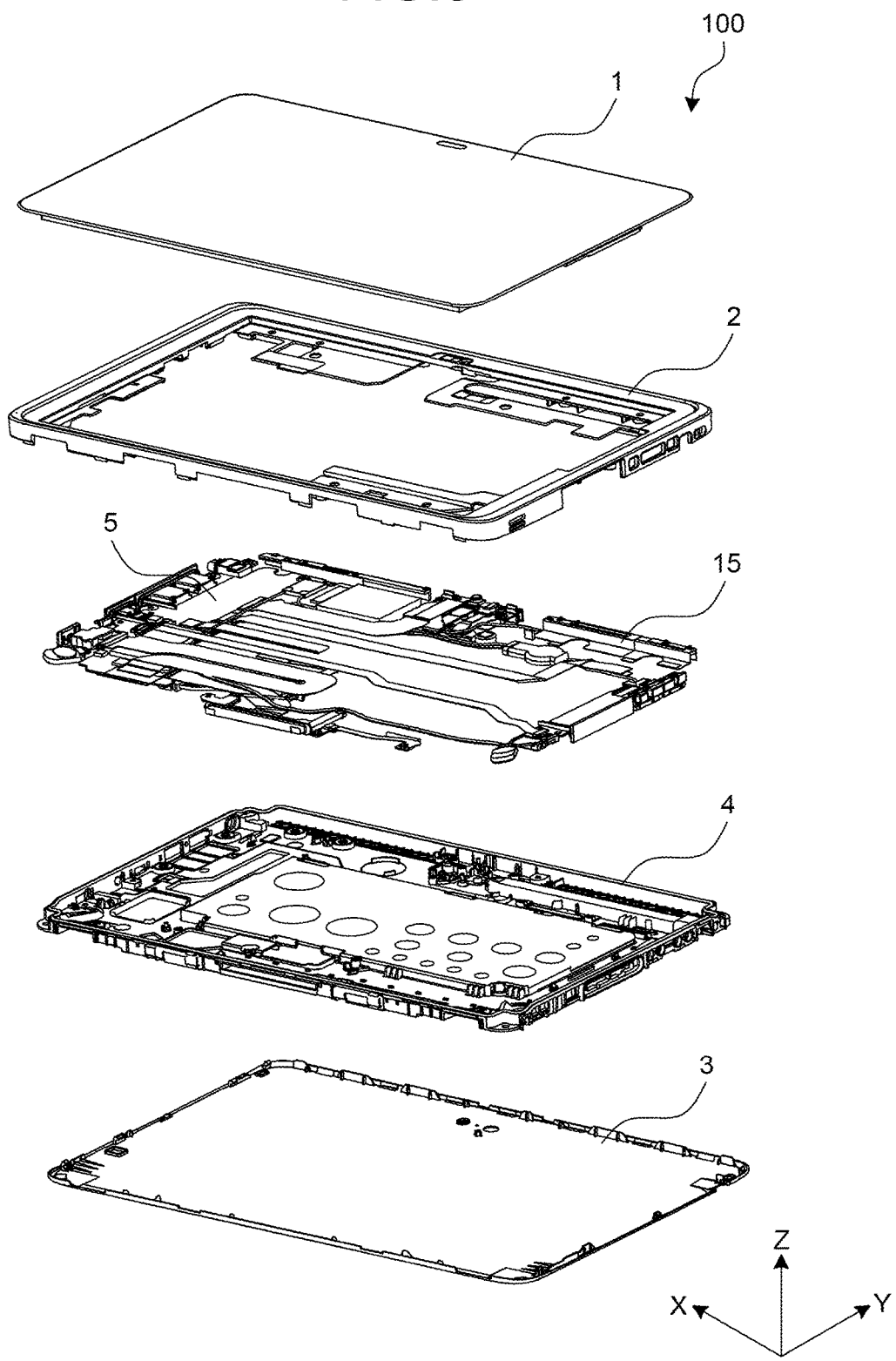
FIG. 3 is an exploded perspective view of the tablet-type terminal device.

FIG. 3 is an exploded perspective view of the tablet-type terminal device. The tablet-type terminal device 100 is assembled such that the rear cover 3, a core cover 4, an internal component 15, the front cover 2, and the touch panel 1 are sequentially laid over in the Z direction.

The touch panel 1 includes for example a liquid crystal display. Furthermore, the touch panel 1 presents images on the display. Moreover, the touch panel 1 receives an input at the pressed position on the screen when the display is pressed.

The front cover 2 includes the frame into which the touch panel 1 is fitted. Furthermore, the front cover 2 includes the peripheral cover and the side cover for the touch panel 1 of the tablet-type terminal device 100. Moreover, the front cover 2, on which the touch panel 1 is mounted, is combined with the core cover 4 so as to cover the internal component 15 that is attached to the core cover 4. The front cover 2 is equivalent to an example of a "first member".

The internal component 15 is a group of components, including a main board 5, for implementing various functions of the tablet-type terminal device 100. The internal component 15 further includes a hard disk, a communication device, a speaker, a connection cable, or the like.

The core cover 4 is a member to which the internal component 15 is attached. The core cover 4 is covered by the front cover 2 and the rear cover 3 in a state such that the internal component 15 is attached. Specifically, the main board 5, on which a central processing unit (CPU) is installed, is attached to the core cover 4. Furthermore, for example, a wireless local area network (W-LAN) antenna, a speaker, or a microphone is attached to the core cover 4.

The external of the core cover 4 is covered by the front cover 2 and the rear cover 3. Specifically, the core cover 4 is provided in the internal space that is formed when the front cover 2 and the rear cover 3 are assembled.

Furthermore, in the core cover 4 according to the present embodiment, a waterproof packing is provided at the position where it abuts the front cover 2. The waterproof packing is provided such that it surrounds the internal component 15, which is mounted on the core cover 4. The waterproof packing prevents water from entering the internal component 15, which is mounted on the core cover 4, from outside. Here, if there is no need to improve the waterproof property, the waterproof packing does not need to be provided.

The rear cover 3 covers the surface of the core cover 4 at the opposite side of the front cover 2. Furthermore, the rear cover 3 is engaged with the front cover 2 with the core cover 4 interposed therebetween, and it is combined with the front cover 2 by using attachment, such as a screw. A battery, or the like, may be provided between the rear cover 3 and the core cover 4. The rear cover 3 is an example of a "second member".

Figure 4:
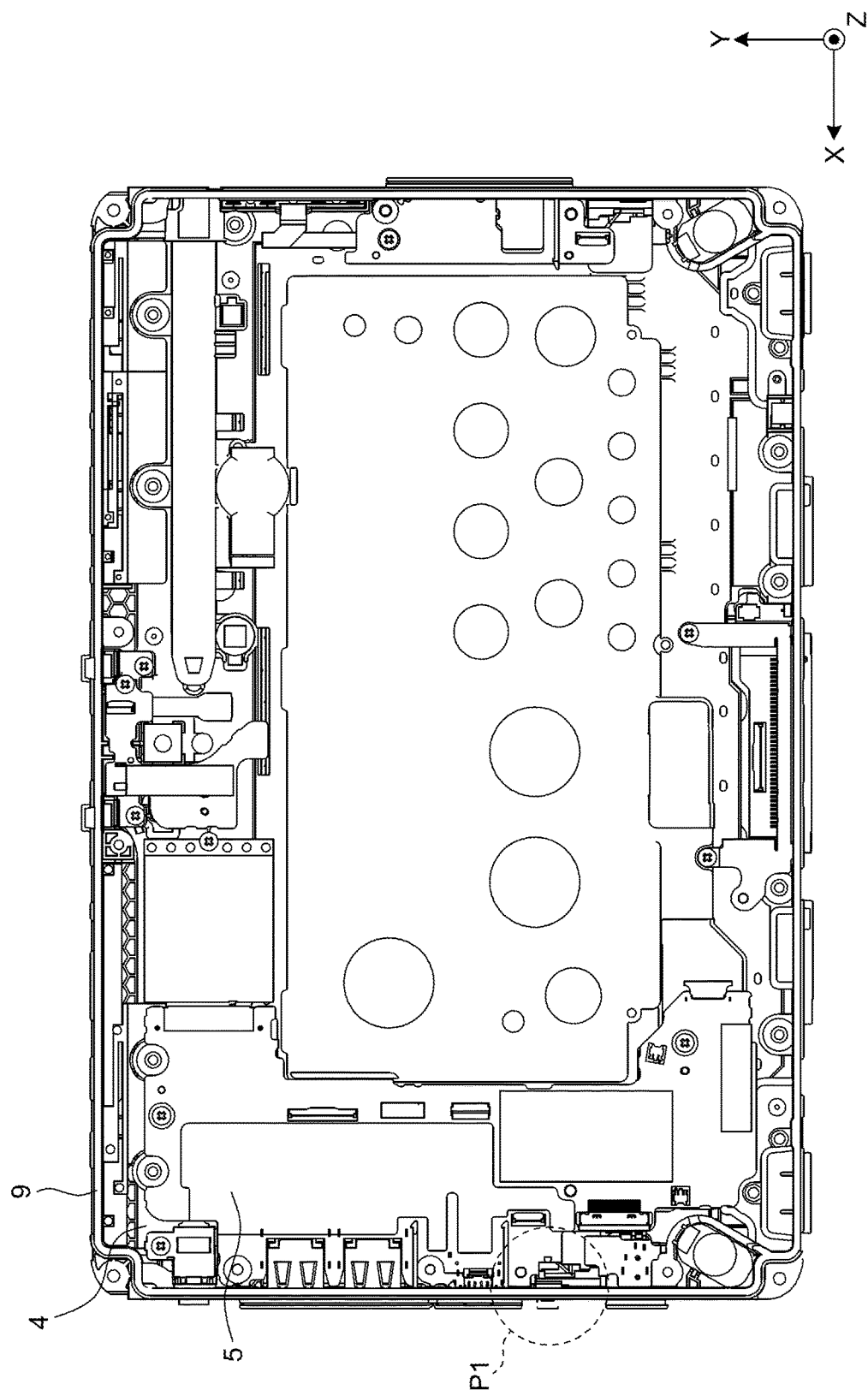
FIG. 4 is a plan view of a core cover.

FIG. 4 is a plan view of the core cover. FIG. 4 illustrates the state where the core cover 4 is viewed in a direction toward the opposite Z direction. Specifically, the core cover 4, illustrated in FIG. 4, is in a state such that only the core cover 4 in the state of FIG. 3 is extracted and it is viewed from the side of the front cover 2 without change.

The entire outer edge of the core cover 4 is in contact with the front cover 2. Furthermore, a waterproof packing 9 is provided at the position of the entire outer edge of the core cover 4, at which it is in contact with the front cover 2. Moreover, the main board 5 is mounted on the core cover 4.

The main board 5 is a board on which a component, such as a CPU or a memory, which performs the main calculation operations of the tablet-type terminal device 100, is mounted. The main board 5 is fixed to the core cover 4 by using a screw, or the like.

An area P1 of FIG. 4 is an area near the area where a light emitting diode (LED) for an indicator is provided in a state where the front cover 2 and the core cover 4 are assembled. Furthermore, FIG. 5 is an enlarged view of the area P1.

Figure 5:
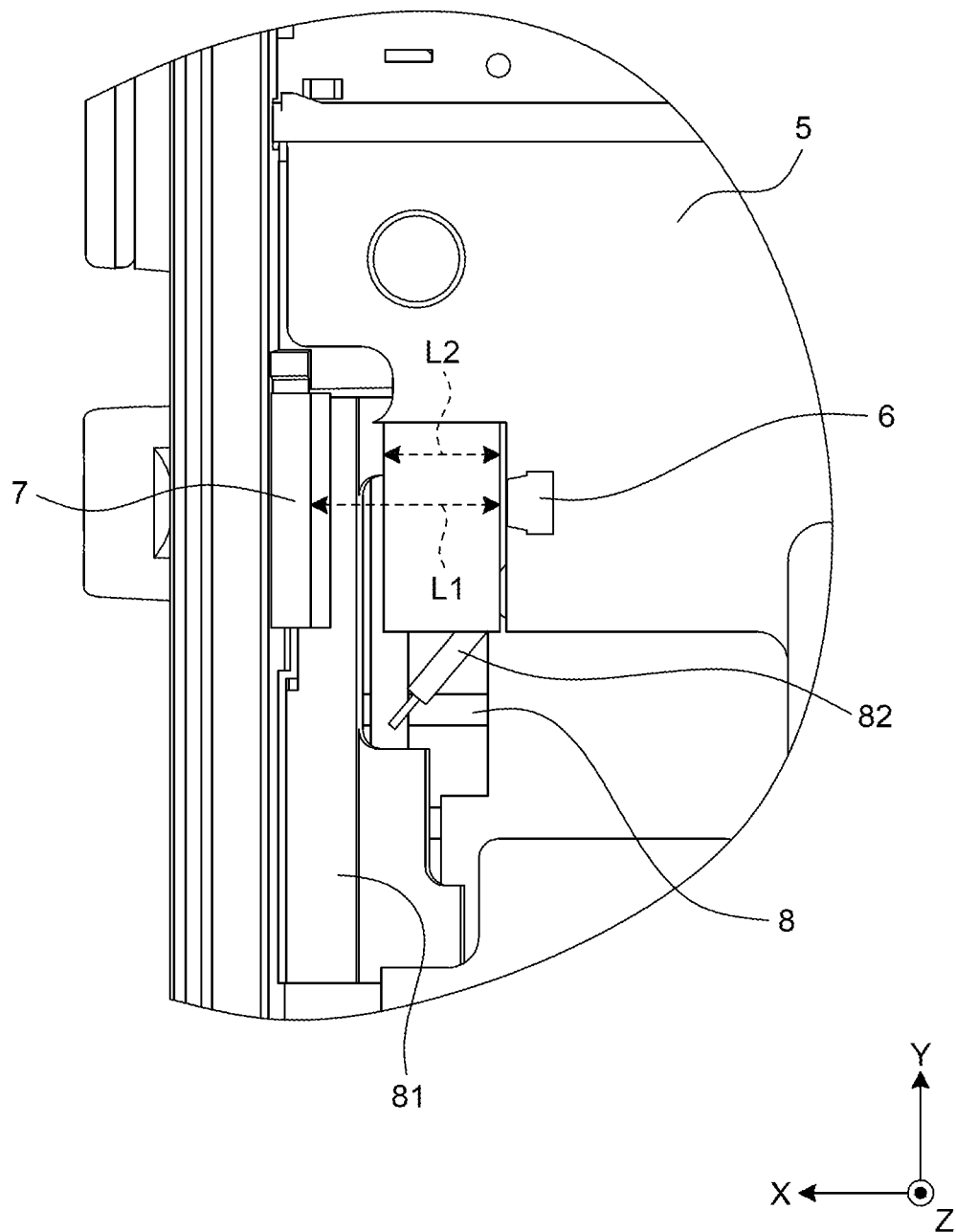
FIG. 5 is an enlarged view of an area.

As illustrated in FIG. 5, an LED 6, a light guiding member 7, and a W-LAN antenna 8 are provided at the area P1 of the core cover 4.

Figure 6A:
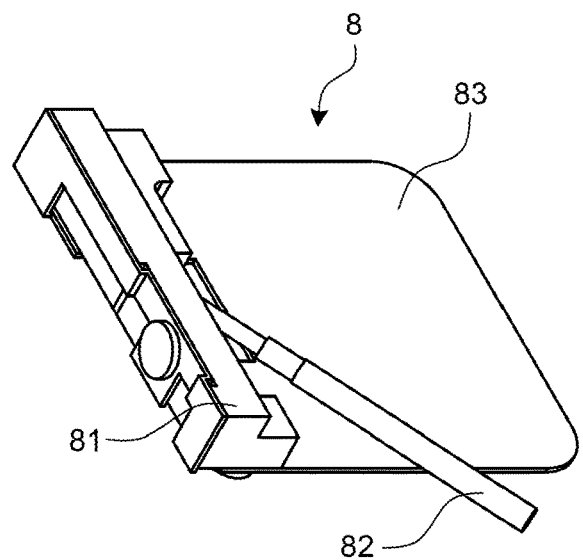
FIG. 6A is a perspective view of a W-LAN antenna.
Figure 6B:
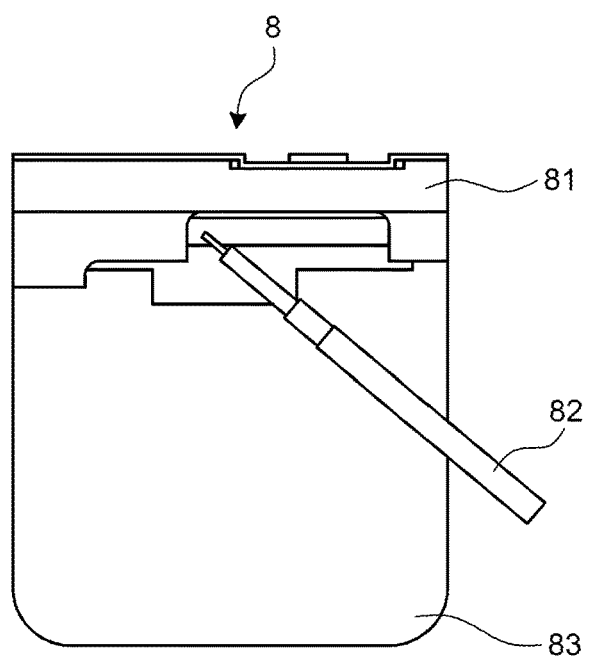
FIG. 6B is a plan view of the W-LAN antenna.

FIG. 6A is a perspective view of the W-LAN antenna. FIG. 6B is a plan view of the W-LAN antenna. As illustrated in FIGS. 6A and 6B, the W-LAN antenna 8 includes a communication unit 81, a cable 82, and a ground 83. The W-LAN antenna 8 is an example of a "different member" and a "communication device".

The cable 82 extends from the communication unit 81 to the CPU that is installed on the main board 5. Furthermore, the ground 83 is connected to the communication unit 81.

The communication unit 81 performs a communication with an external W-LAN device, such as a W-LAN router. Furthermore, the communication unit 81 performs a communication with the CPU via the cable 82. It is preferable that, as the communication unit 81 performs a communication with an external W-LAN device, metallic components are prevented from being arranged in the neighborhood. For example, to reduce the interference between the radio waves, generated by the communication unit 81, and the circuit, it is preferable to prevent metallic circuits from being arranged near the communication unit 81.

The LED 6 is a light source that generates light when it receives a supply of the electric power. The LED 6 is mounted on the main board 5. Part of the light, generated by the LED 6, reaches the light guiding member 7.

The LED 6 is connected to a circuit that is printed on the main board 5 to supply the electricity. Therefore, if the LED 6 is provided near the communication unit 81, it means that the circuit is provided near the communication unit 81; therefore, the communication property of the communication unit 81 is degraded. Thus, the LED 6 is provided in the backward direction, i.e., backward in the opposite X direction, so that it is not provided near the communication unit 81. According to the present embodiment, the LED 6 is located at a position away from the light guiding member 7 by a distance L1. Furthermore, no circuits are provided in the area between the LED 6 on the main board 5 and the light guiding member 7, i.e., the area with a distance L2. Thus, the communication property of the communication unit 81 may be retained.

Furthermore, the main board 5 extends from the LED 6 to the neighborhood of the light guiding member 7. Therefore, the main board 5 covers the optical path of the light, which is generated by the LED 6 and which travels toward the light guiding member 7, on the side of the rear cover 3, i.e., the side of the XY plane. Thus, the main board 5 prevents the leakage of the light, generated by the LED 6, in the opposite Z direction. The main board 5 is an example of a "board".

Part of the light guiding member 7 is exposed to outside from the core cover 4. The exposed area of the light guiding member 7 is an indicator. Hereafter, the area of the light guiding member 7, which is exposed to outside and is recognizable by the operator, is referred to as an indicator. The light guiding member 7 receives the light that is generated by the LED 6. Then, the light guiding member 7 guides the received light to the indicator. Thus, when the LED 6 generates light, a user may check the lighting of the indicator.

FIG. 7 is a plan view of the front cover. FIG. 7 illustrates the state where the front cover is viewed in the Z direction. That is, the front cover 2, illustrated in FIG. 7, is in a state where the front cover 2 in the state of FIG. 3 is turned over such that the X direction and the opposite X direction are reversed.

An area P2 of FIG. 7 is an area near the area where the LED 6 is provided in a state where the front cover 2 and the core cover 4 are assembled. Furthermore, FIG. 8 is an enlarged view of the area P2.

Figure 8:
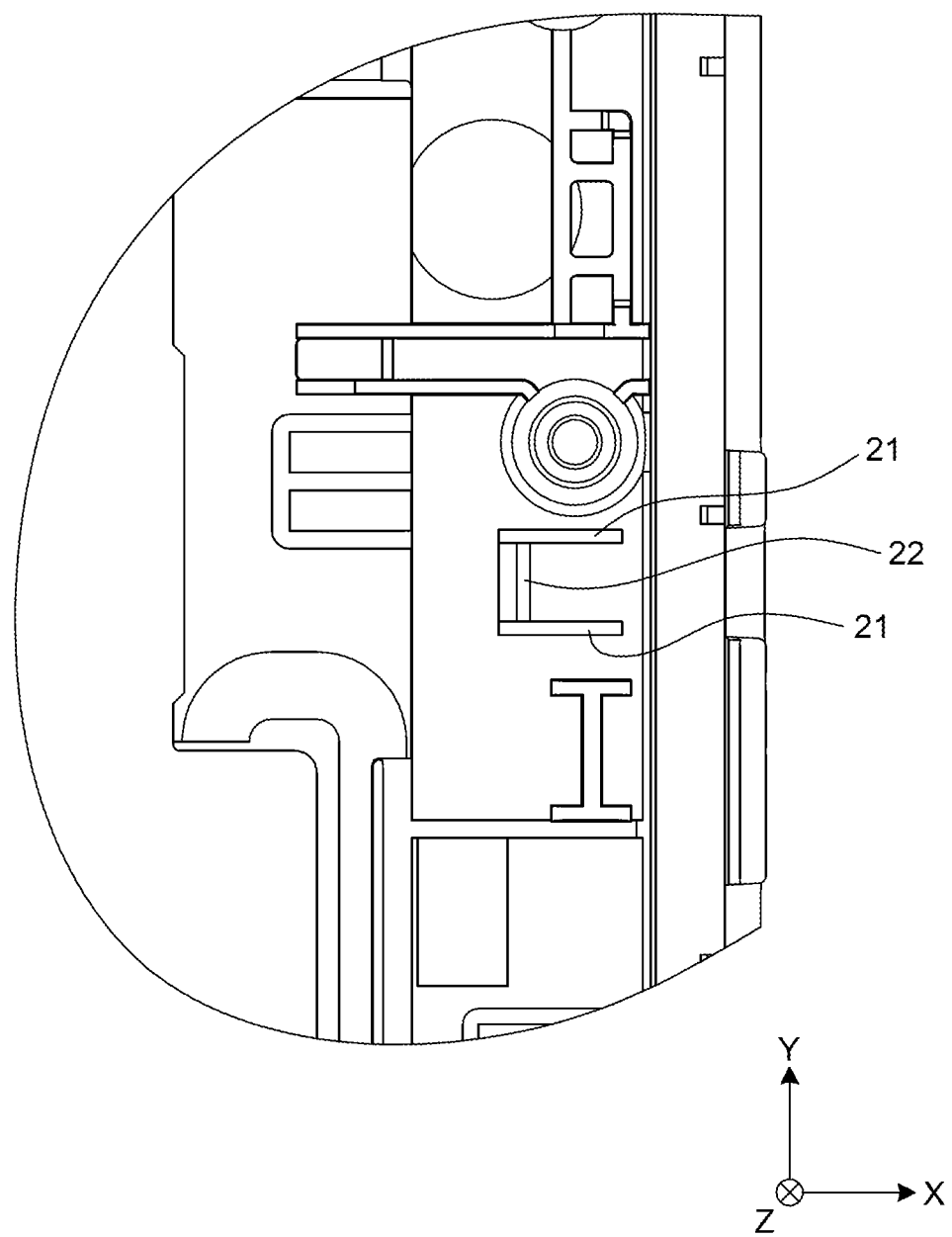
FIG. 8 is an enlarged view of an area.

As illustrated in FIG. 8, the front cover 2 includes side shielding plates 21 and a back shielding plate 22. The side shielding plates 21 and the back shielding plate 22 are plate-like projected portions that extend from the inner wall of the front cover 2 to the core cover 4 in a state where the front cover 2 and the core cover 4 are assembled.

The side shielding plate 21 has a surface that is parallel to the XZ plane. Furthermore, the side shielding plate 21 covers the side of the XZ plane of the optical path of the light, which is generated by the LED 6 and which travels toward the light guiding member 7, in a state where the front cover 2 and the core cover 4 are assembled. The two side shielding plates 21 are arranged so as to sandwich the optical path on both sides of the optical path of the light, which is generated by the LED 6 and which travels toward the light guiding member 7, with respect to the Y direction. The side shielding plate 21 prevents the leakage of the light, generated by the LED 6, in the Y direction.

Furthermore, the side shielding plate 21 is arranged so as to extend to the position where it is in contact with the light guiding member 7. Thus, when a water pressure is applied to the light guiding member 7 from outside, the light guiding member 7 is brought into contact with the side shielding plate 21; thus, the side shielding plate 21 prevents the light guiding member 7 from moving backward in the opposite X direction. In this way, the side shielding plate 21 prevents water from entering through the light guiding member 7, whereby the waterproof effect is improved.

The back shielding plate 22 is provided at the position opposite to the light guiding member 7 relative to the light emission area of the LED 6. The back shielding plate 22 has a surface that is parallel to the YZ plane. Furthermore, the back shielding plate 22 blocks the light which is generated by the LED 6 and which travels in the opposite X direction. The back shielding plate 22 prevents the leakage of the light, generated by the LED 6, in the opposite X direction.

Figure 9:
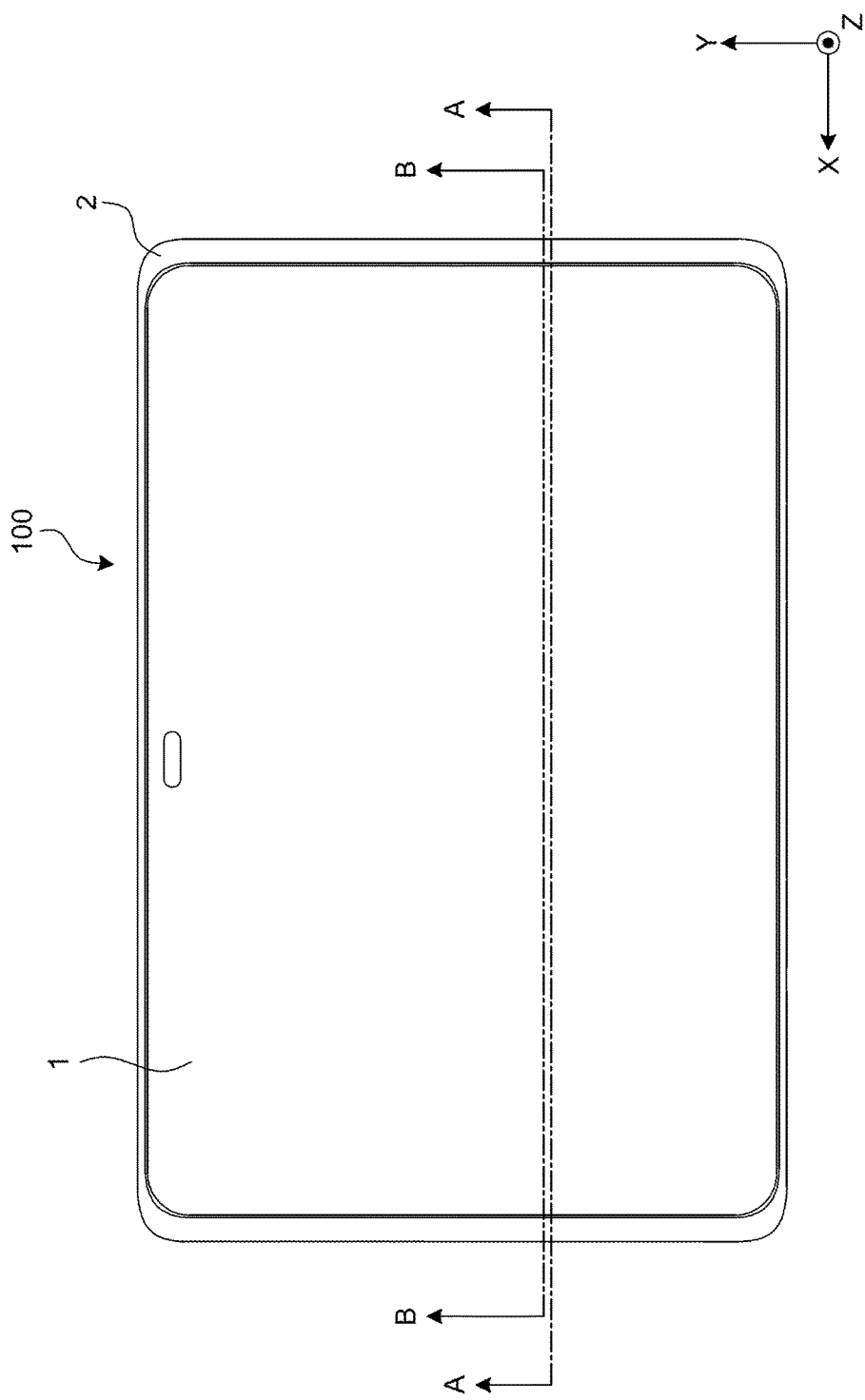
FIG. 9 is a plan view of the tablet-type terminal device.
Figure 10:
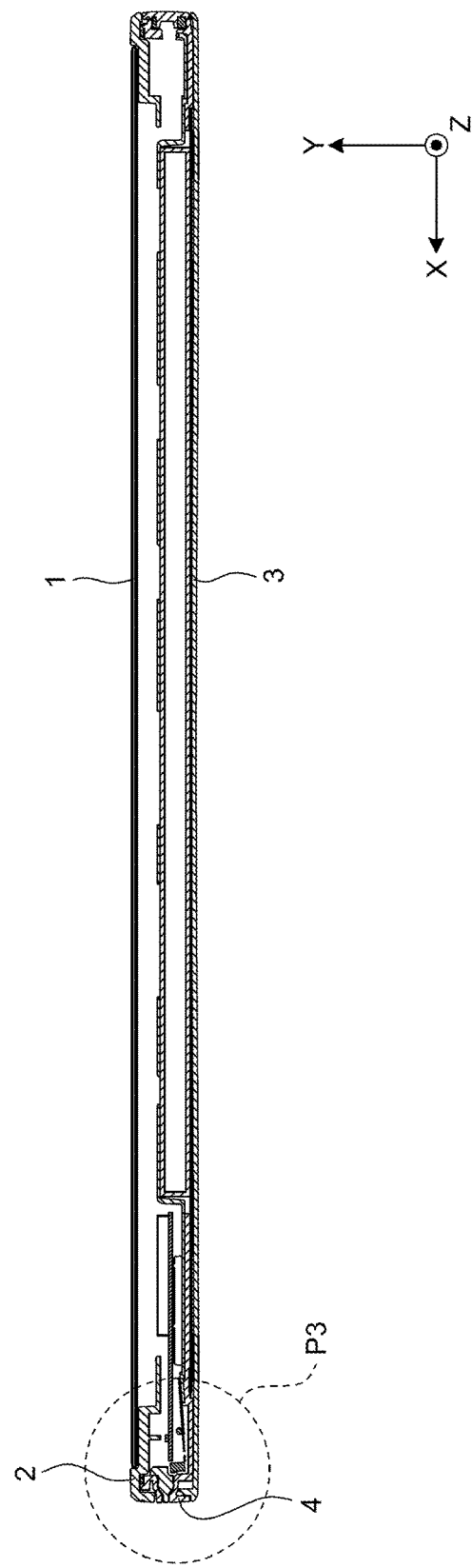
FIG. 10 is an A-A cross-sectional view.

Furthermore, each member is explained in detail. FIG. 9 is a plan view of the tablet-type terminal device. FIG. 10 is an A-A cross-sectional view. FIG. 10 illustrates the cross-sectional surface at the position where the LED 6 and the light guiding member 7 of the tablet-type terminal device 100 are sectioned. The LED 6 and the light guiding member 7 are provided within an area P3 of FIG. 10.

Figure 11:
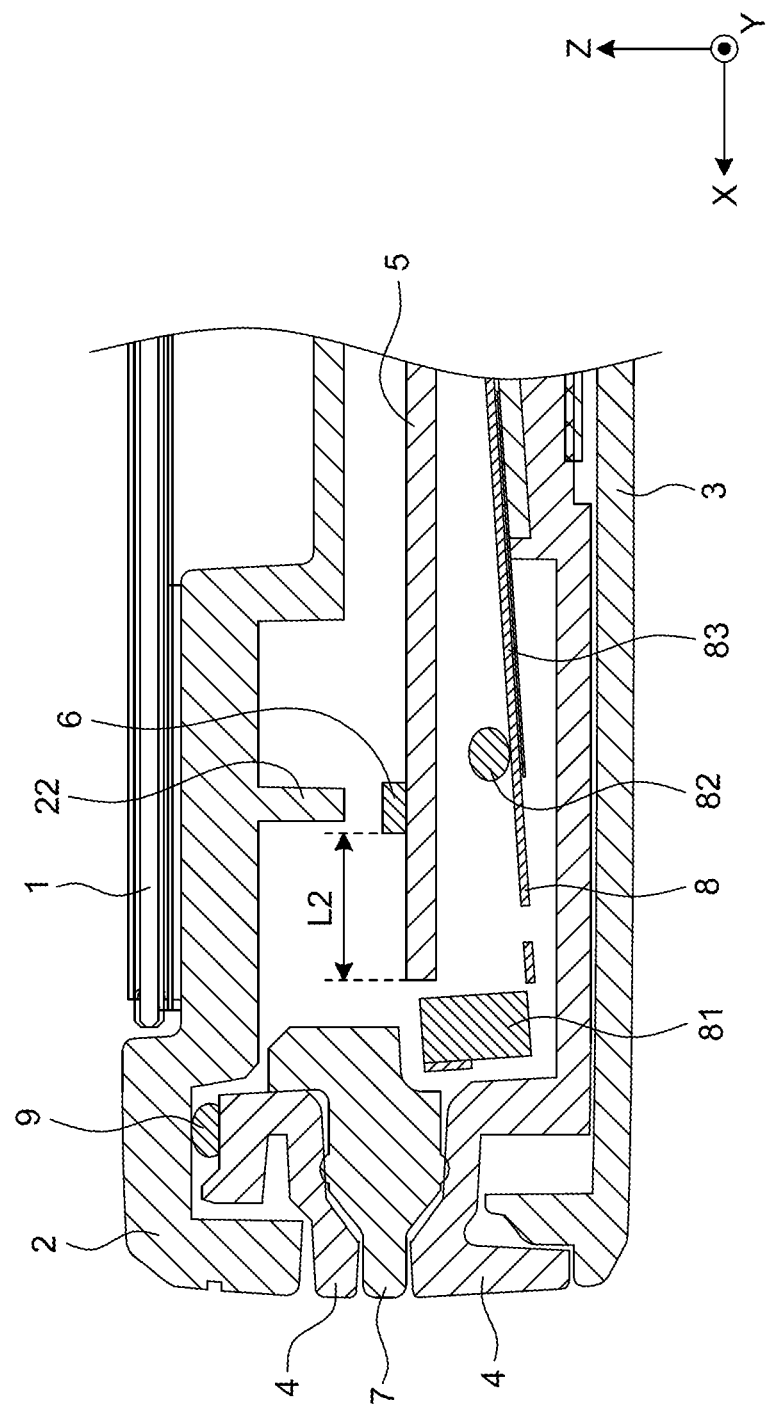
FIG. 11 is an enlarged and schematic cross-sectional view of an area.
Figure 12:
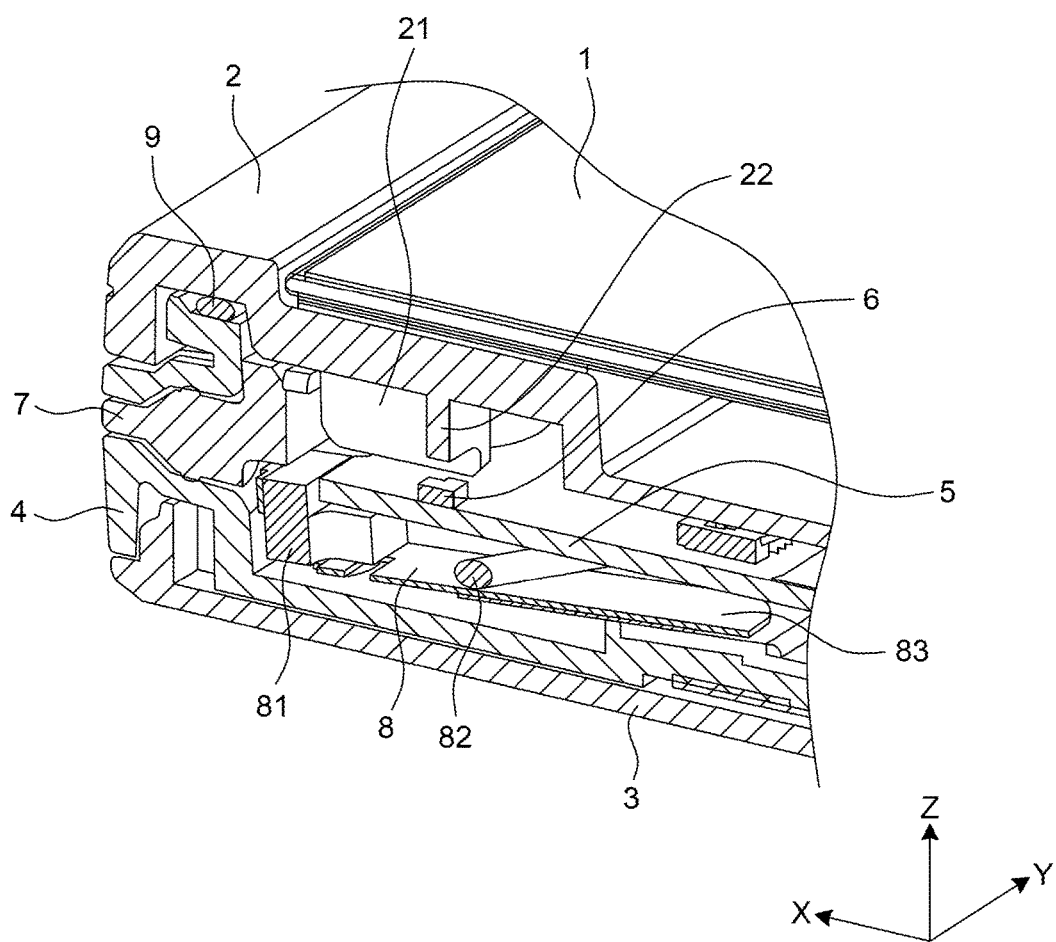
FIG. 12 is a cross-sectional and perspective view of the neighborhood of an LED and a light guiding member of the tablet-type terminal device according to a first embodiment.

FIG. 11 is an enlarged and schematic cross-sectional view of the area P3. Furthermore, FIG. 12 is a cross-sectional and perspective view of the neighborhood of the LED and the light guiding member of the tablet-type terminal device according to the first embodiment. The touch panel 1 is mounted on the front cover 2. Furthermore, the core cover 4 is provided in the space that is formed when the front cover 2 and the rear cover 3 are assembled.

The core cover 4 has a hole that leads to outside from the side surface of the tablet-type terminal device 100 with respect to the X direction. The light guiding member 7 is provided so as to be engaged with the hole, leading to outside, of the core cover 4. Furthermore, the light guiding member 7 includes the section that faces the outside of the tablet-type terminal device 100.

As illustrated in FIGS. 11 and 12, on the A-A cross section of the side surface of the tablet-type terminal device 100 in the X direction, the rear cover 3, the core cover 4, the light guiding member 7, the core cover 4, and the front cover 2 are provided such that they are stacked in this order in the Z direction. Furthermore, the waterproof packing 9 is provided between the front cover 2 and the core cover 4. The waterproof packing 9 prevents water from entering the space that is formed by the front cover 2 and the rear cover 3.

Furthermore, the light emission area of the LED 6 is located on the side of the light guiding member 7. Therefore, according to the present embodiment, the back shielding plate 22 is located at the position where it is overlapped with the LED 6 in the Z direction. Furthermore, the main board 5 extends from the LED 6 toward the light guiding member 7, and no circuits are provided in the area with the distance L2.

Furthermore, the W-LAN antenna 8 is arranged at a tilt toward the opposite Z direction, i.e., toward the rear cover 3, as it is located further in the X direction. In this way, the communication unit 81 is provided such that it tilts in the opposite Z direction so as not to block the light that is generated by the LED 6.

Furthermore, if the LED 6 emits light in the state of FIG. 11, the back shielding plate 22 blocks the light that travels in the opposite X direction, thereby preventing the leakage of the light to outside in the opposite X direction when viewed from the LED 6. Furthermore, the light, generated by the LED 6, is prevented from traveling in the Z direction by the front cover 2 and the touch panel 1. Furthermore, the light, generated by the LED 6, is prevented from traveling in the opposite Z direction by the main board 5.

Figure 13:
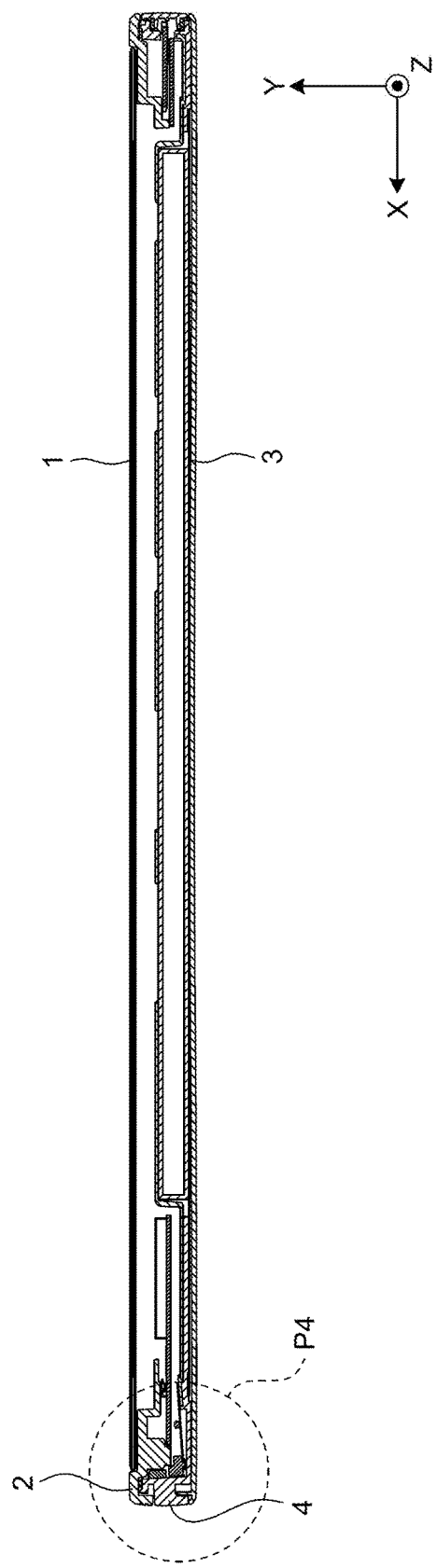
FIG. 13 is a B-B cross-sectional view.

Furthermore, each member is explained in detail. FIG. 13 is a B-B cross-sectional view. FIG. 13 illustrates the cross-sectional surface at the position where the side shielding plate 21 of the tablet-type terminal device 100 is sectioned. The LED 6 and the light guiding member 7 are provided within an area P4 of FIG. 13.

Figure 14:
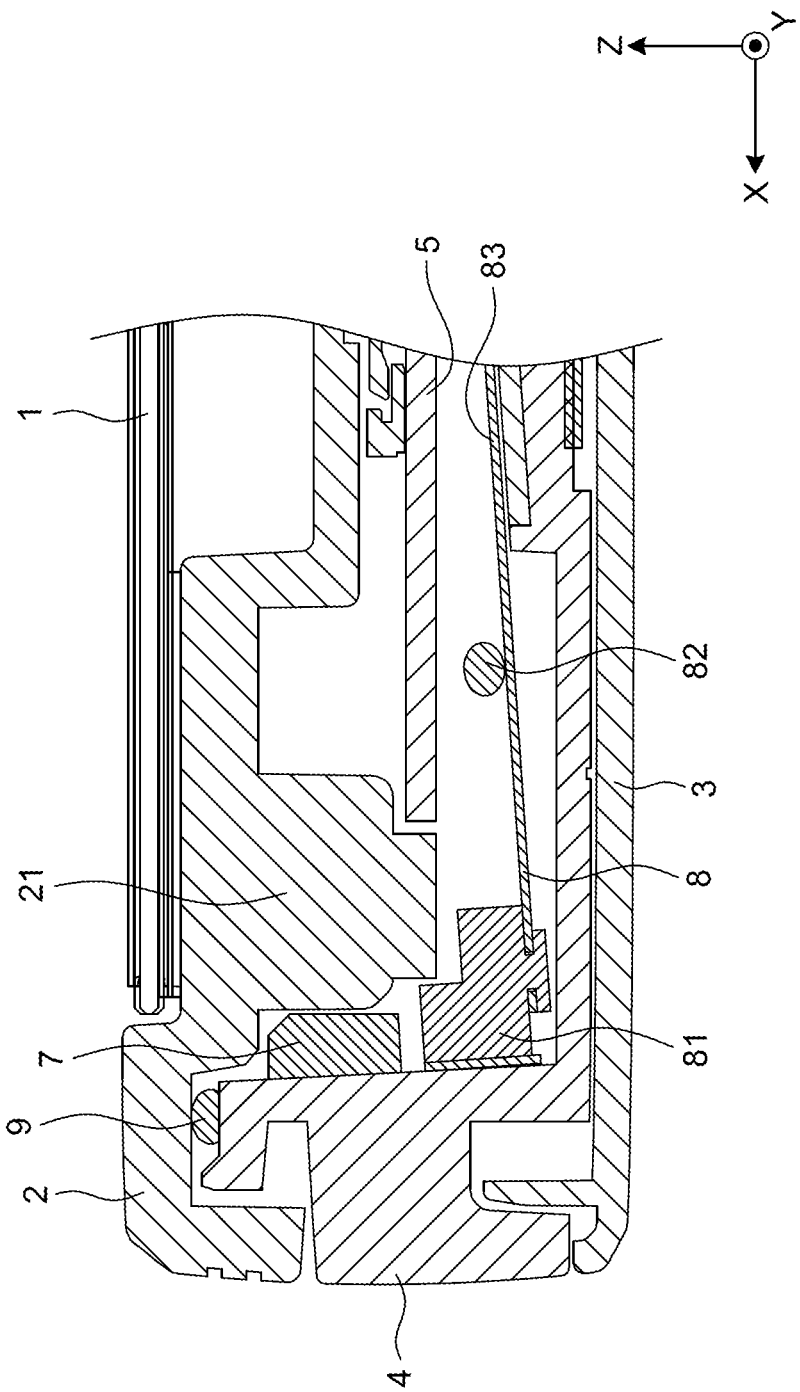
FIG. 14 is an enlarged and schematic cross-sectional view of an area.

FIG. 14 is an enlarged and schematic cross-sectional view of the area P4. As illustrated in FIG. 14, the side shielding plate 21 is provided such that it is in contact with the light guiding member 7 in the X direction. Furthermore, the side shielding plate 21 has a length that reaches the LED 6 from the light guiding member 7. Moreover, the side shielding plate 21 extends to the neighborhood of the main board 5. Thus, as illustrated in FIG. 13, the side shielding plate 21 has a flat surface that is perpendicular to the Y direction, and it covers the area that is parallel to the XZ plane between the LED 6 and the light guiding member 7. Furthermore, the side shielding plates 21 are arranged at the two positions to sandwich the optical path of the light, which is generated by the LED 6 and which travels toward the light guiding member 7. Thus, when the LED 6 emits light, the side shielding plate 21 blocks the light that travels in the Y direction and in the opposite Y direction, thereby preventing the leakage of the light to outside in the Y direction and in the opposite Y direction.

The main board 5, the side shielding plate 21, and the back shielding plate 22 in FIGS. 11 and 14 prevent the light, generated by the LED 6, from travelling other than in the direction toward the light guiding member 7, thereby preventing excess light leakage.

Then, the light, generated by the LED 6, is received by the light guiding member 7, and it is emitted to outside from the side surface of the tablet-type terminal device 100 in the X direction. Thus, the indicator, which is the area of the light guiding member 7 facing to outside, is turned on.

Furthermore, when the tablet-type terminal device 100 is soaked in water, the light guiding member 7 is pressed in the opposite X direction. In this case, if nothing is provided on the side of the light guiding member 7 in the opposite X direction, the light guiding member 7 is pushed to inside, and water enters through the hole of the core cover 4, with which the light guiding member 7 is engaged. In this aspect, in the tablet-type terminal device 100 according to the present embodiment, as the side shielding plate 21 abuts the light guiding member 7, the side shielding plate 21 prevents the light guiding member 7 from moving to inside when the light guiding member 7 is pressed to inside. This prevents water from entering through the hole of the core cover 4, with which the light guiding member 7 is engaged.

Figure 15:
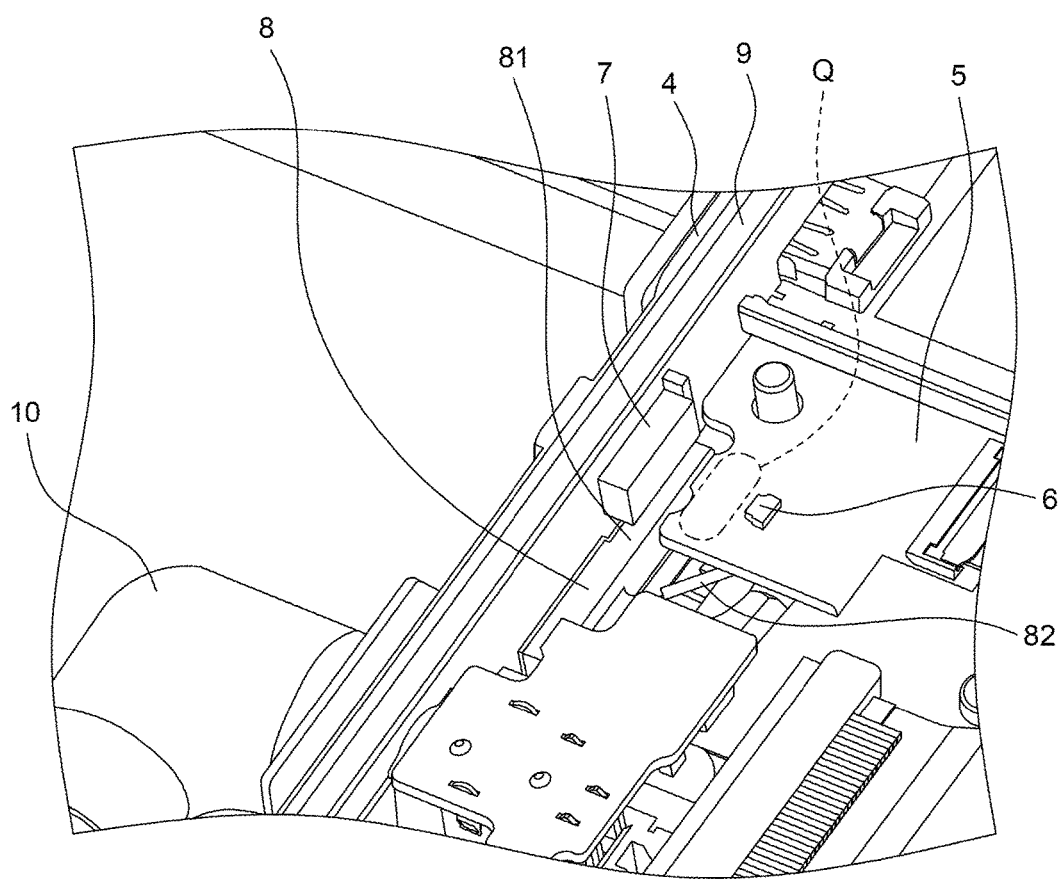
FIG. 15 is a perspective view of the neighborhood of the LED of the tablet-type terminal device in a state where the front cover is not spread over.
Figure 16:
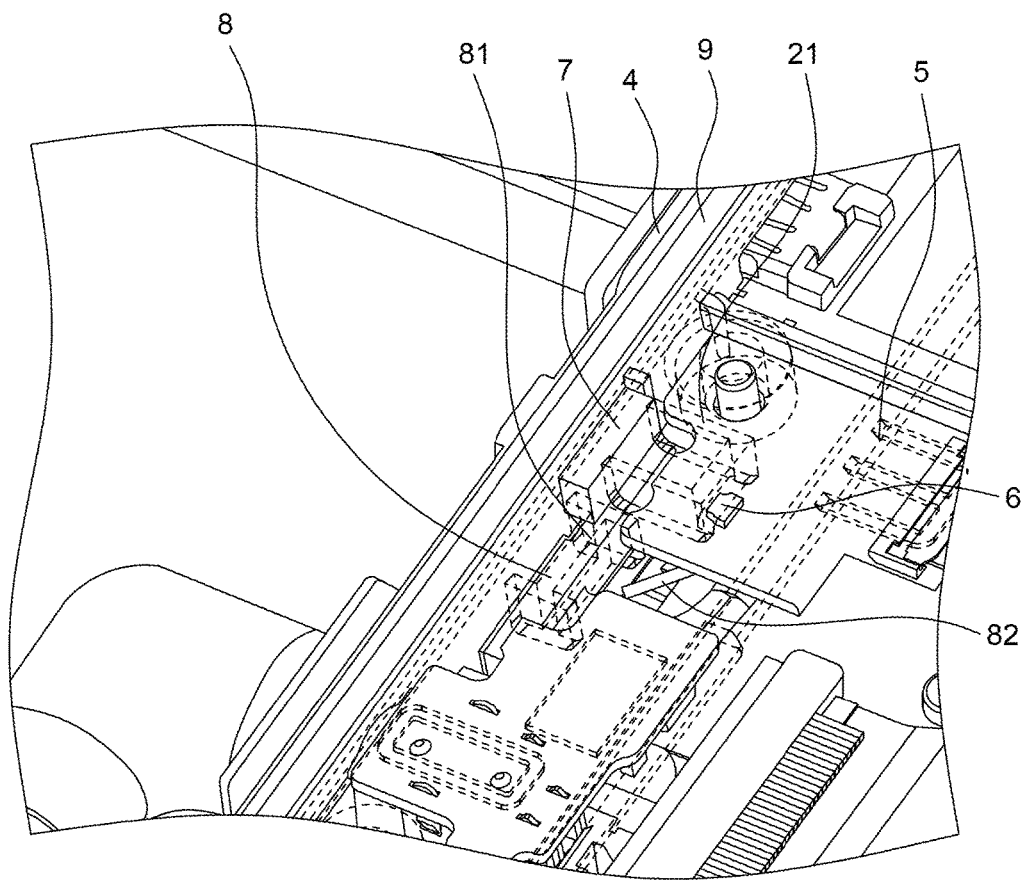
FIG. 16 is a perspective view of the neighborhood of the LED to explain the tablet-type terminal device in a state where the front cover is spread over.

Furthermore, with reference to FIGS. 15 and 16, an explanation is given of irradiation and shielding of the light, generated by the LED 6, and arrangement of the indicator.

FIG. 15 is a perspective view of the neighborhood of the LED of the tablet-type terminal device in a state where the front cover is not spread over. FIG. 15 illustrates the state where a DC cable 10 is connected to a DC jack of the tablet-type terminal device 100.

As illustrated in FIG. 15, the LED 6 is mounted on the main board 5. Furthermore, the area of the main board 5, on which the LED 6 is mounted, is provided such that it is overlapped with the W-LAN antenna 8. Furthermore, the communication unit 81 of the W-LAN antenna 8 is provided between the LED 6 and the light guiding member 7 in such a manner that it does not protrude. Moreover, no circuits are provided on an area Q of the main board 5. Thus, the communication property of the W-LAN antenna 8 is not degraded. Furthermore, the light, generated by the LED 6, is emitted to the light guiding member 7. Moreover, the optical path, connecting the LED 6 and the light guiding member 7, on the side of the rear cover 3 is covered by the main board 5.

Furthermore, FIG. 16 is a perspective view of the neighborhood of the LED to explain the tablet-type terminal device in a state where the front cover is spread over. Each member, indicated by a dotted line in FIG. 16, illustrates part of the front cover 2.

As illustrated in FIG. 16, the optical path, connecting the LED 6 and the light guiding member 7, is covered by the side shielding plate 21 and the back shielding plate 22. Furthermore, the optical path, connecting the LED 6 and the light guiding member 7, is covered by the front cover 2. In this way, the light, generated by the LED 6, is blocked except for the light that travels toward the light guiding member 7. Thus, the tablet-type terminal device 100 prevents the light, generated by the LED 6, from leaking to outside through other than the indicator.

Furthermore, as the LED 6 and the light guiding member 7 are overlapped with the W-LAN antenna 8, the LED 6 and the light guiding member 7 may be provided near the DC jack and the connected DC cable 10, whereby the visibility is improved.

As described above, in the tablet-type terminal device according to the present embodiment, as the LED is provided such that it is overlapped with the W-LAN antenna, it is possible to reduce the area of use on the side surface of the tablet-type terminal device, on which an I/O connector, or the like, is provided. This allows a reduction in the size of the tablet-type terminal device. Furthermore, as the indicator may be provided near the indicator's object, e.g., a DC jack, the visibility of the indicator may be improved.

Furthermore, as the LED is provided at the position away from the communication unit of the W-LAN antenna, which is located at an edge section of the tablet-type terminal device, it is possible to prevent the circuit, which is connected to the LED, from being provided near the communication unit, and degradation in the communication property of the W-LAN antenna may be reduced.

Furthermore, the light, generated by the LED, on the opposite side of the front cover is blocked by the main board on which no circuits are provided, whereby the number of components may be reduced, and leakage of the light may be prevented.

Furthermore, the side shielding plate, which shields the light that is generated by the LED, is provided such that it abuts the light guiding member, whereby the number of components may be reduced, and leakage of the light may be prevented.

[b] Second Embodiment

Next, an explanation is given of a second embodiment. The tablet-type terminal device according to the present embodiment is different from that in the first embodiment in that the optical path, connecting the LED and the light guiding member, is enclosed by a member that extends from the front cover like a pouch. In the following explanation, explanations are omitted for each of the members that are the same as those in the first embodiment.

Figure 17:
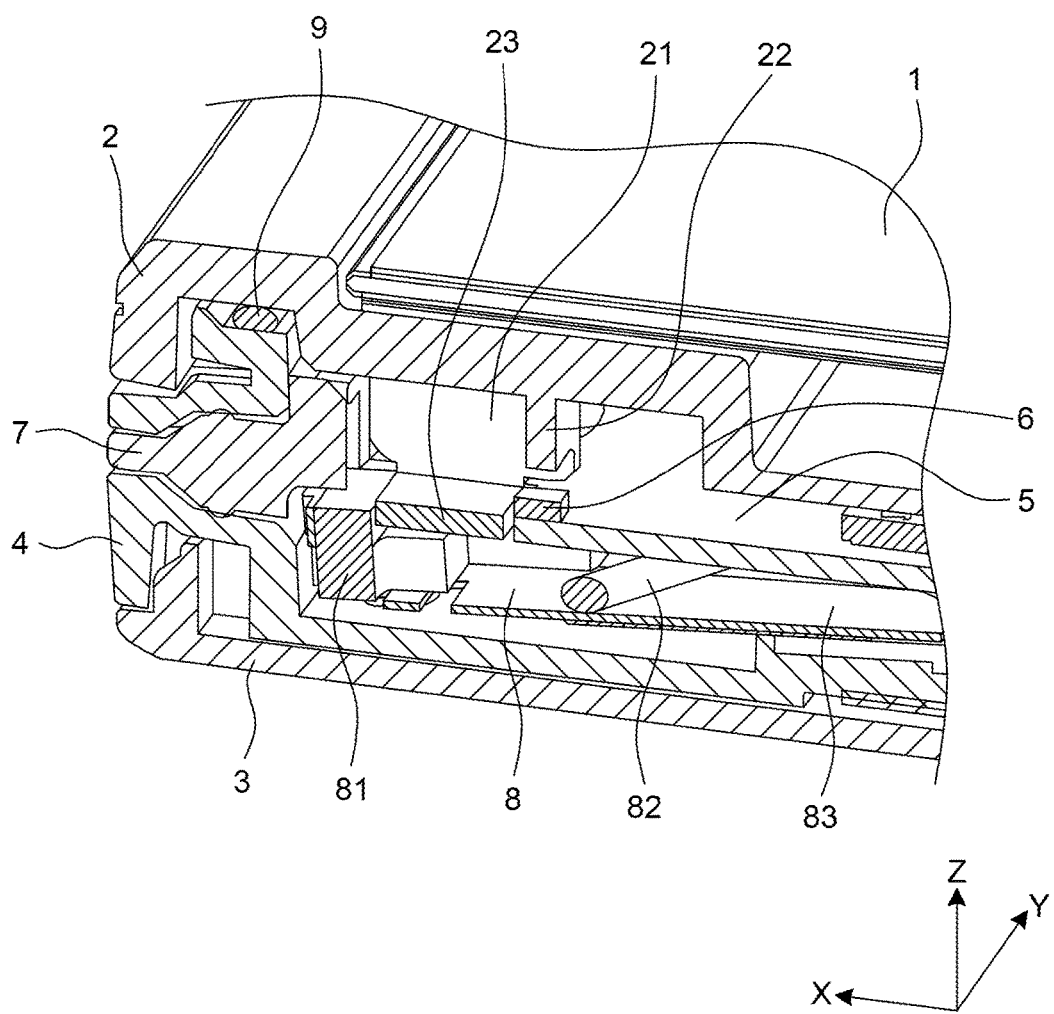
FIG. 17 is a cross-sectional and perspective view of the neighborhood of the LED and the light guiding member of the tablet-type terminal device according to a second embodiment.
Figure 18:
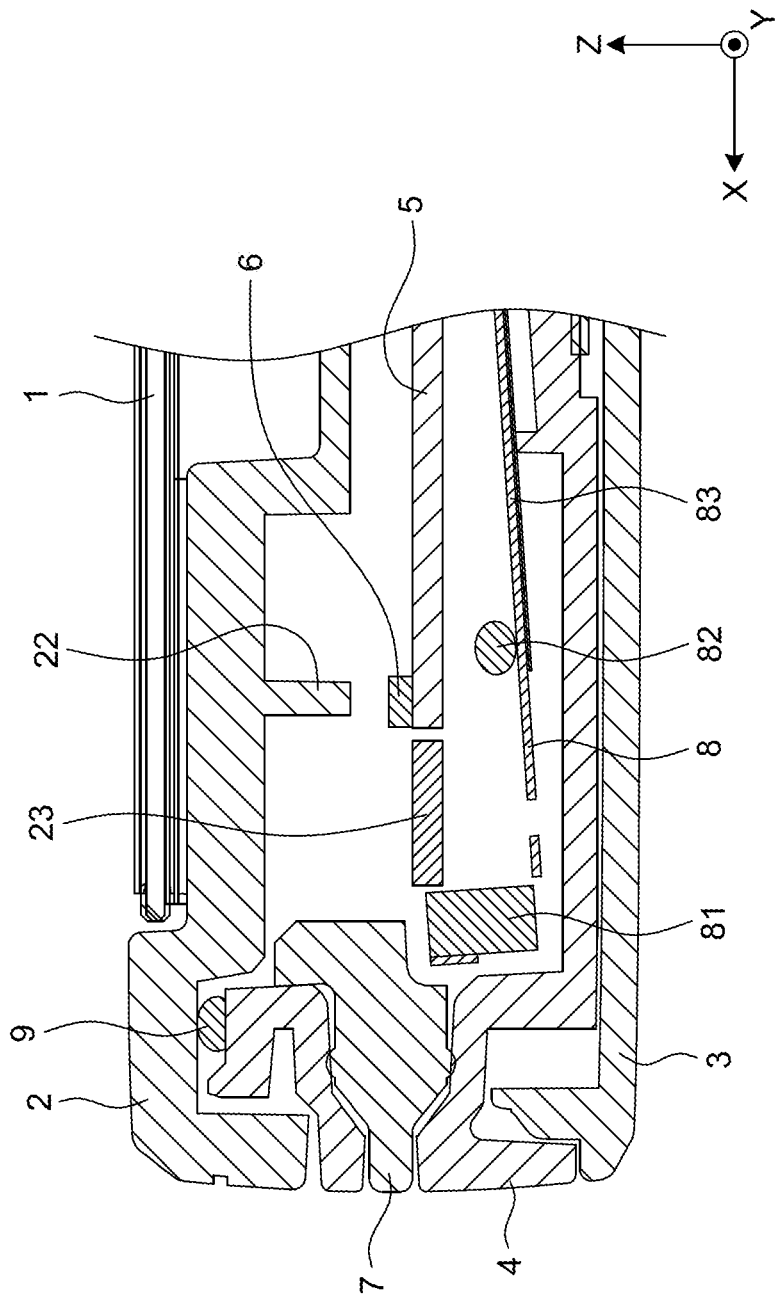
FIG. 18 is a schematic cross-sectional view that is taken along the LED and the light guiding member of the tablet-type terminal device according to the second embodiment.
Figure 19:
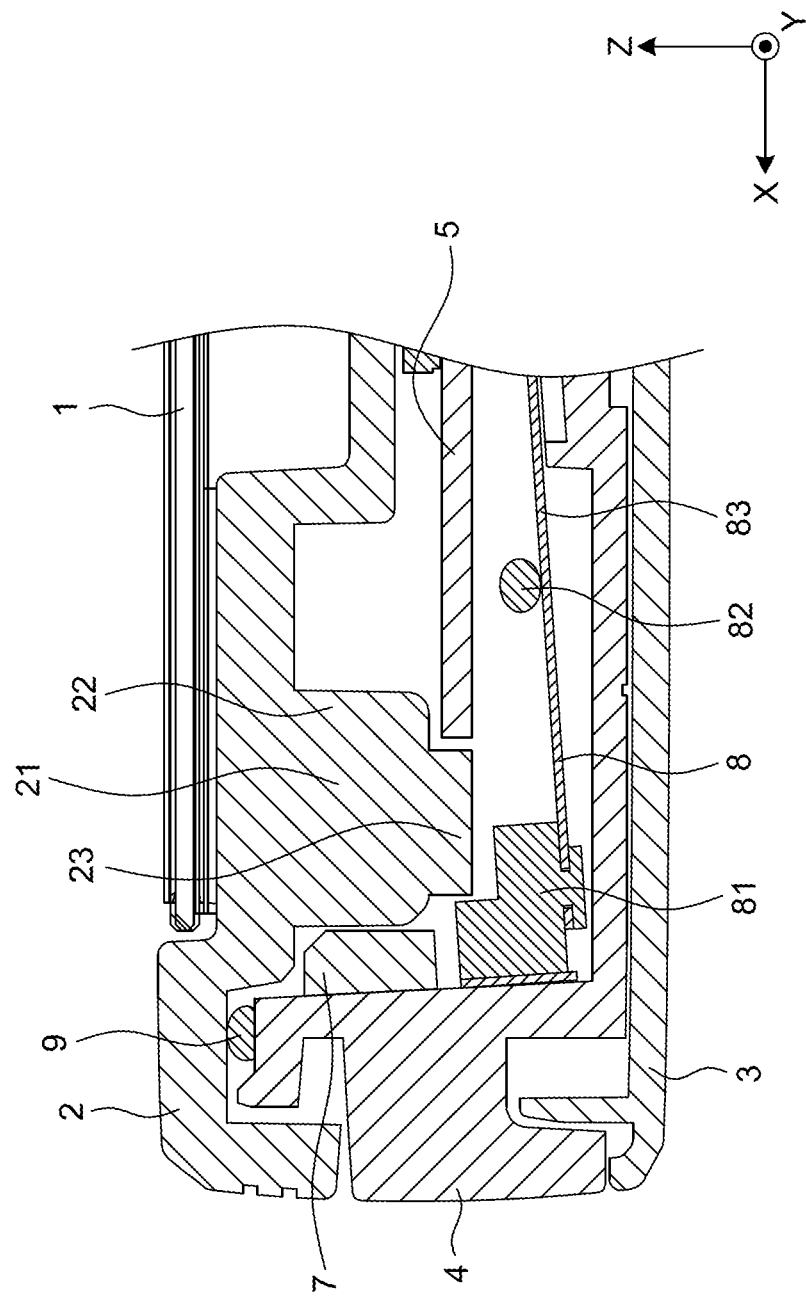
FIG. 19 is a schematic cross-sectional view that is taken along a side shielding plate of the tablet-type terminal device according to the second embodiment.

FIG. 17 is a cross-sectional and perspective view of the neighborhood of the LED and the light guiding member of the tablet-type terminal device according to the second embodiment. FIG. 18 is a schematic cross-sectional view that is taken along the LED and the light guiding member of the tablet-type terminal device according to the second embodiment. FIG. 19 is a schematic cross-sectional view that is taken along the side shielding plate of the tablet-type terminal device according to the second embodiment. FIG. 18 is equivalent to the A-A cross-sectional view of FIG. 9. Furthermore, FIG. 19 is equivalent to the B-B cross-sectional view of FIG. 9.

As illustrated in FIG. 17, the front cover 2 according to the present embodiment includes a rear-cover side shielding plate 23 in addition to the side shielding plate 21 and the back shielding plate 22. The rear-cover side shielding plate 23 is a plate-like member that has a flat surface parallel to the XY plane. Furthermore, the rear-cover side shielding plate 23 connects to the two side shielding plates 21 that have an XY flat surface that extends from the front cover 2 to the rear cover 3.

That is, the front cover 2 includes the member that covers the optical path, connecting the LED 6 and the light guiding member 7, like a pouch in directions other than the direction toward the light guiding member 7. Thus, the light, generated by the LED 6, is blocked in other than the direction toward the light guiding member 7.

According to the present embodiment, the main board 5 does not need to be configured to extend over the area between the LED 6 and the light guiding member 7. Furthermore, according to the present embodiment, as illustrated in FIG. 18, the rear-cover side shielding plate 23 is provided at the position where the main board 5 extends from the LED 6 to the light guiding member 7.

Furthermore, according to the present embodiment, as illustrated in FIG. 19, the side shielding plate 21 is provided such that it abuts the light guiding member 7. Thus, according to the present embodiment, the side shielding plate 21 prevents the light guiding member 7 from moving in the opposite X direction.

As described above, in the tablet-type terminal device according to the present embodiment, the pouch-like member, which protrudes from the front cover, covers the optical path that connects the LED and the light guiding member in other than the direction toward the light guiding member. Thus, it is possible to prevent the leakage of light through other than the indicator.

Furthermore, in the above explanation, the LED and the light guiding member are provided such that they are overlapped with the antenna; however, even if the LED is provided such that it is overlapped with a different member, it is possible to achieve a reduction in the space on the side surface, where an I/O connector of the information processing apparatus is provided.

Particularly, the member on which the LED is laid in an overlapped manner is preferably a member that does not need to be mounted on the main board, i.e., a member that is different from the main board. This is because, in the case of the member that is mounted on the main board, in order to lay the LED in an overlapped manner, a configuration is such that the LED or the target member is mounted on a sub board, which connects to the main board, and then they are stacked. In such a case, the two boards are stacked, which results in an increase in the thickness. In this aspect, for information processing apparatuses, such as tablet-type terminal devices, which need to be made thinner, it is preferable to reduce the thickness. For example, the LED may be provided such that it is laid on a speaker that is a member different from the main board. Furthermore, the LED may be provided such that it is laid on a card slot for a SIM card, or the like.

Furthermore, if the LED is overlapped with other than an antenna, no consideration needs to be given to effects on the communication property; therefore, the LED may be provided near the light guiding member.

According to one aspect of the information processing apparatus, disclosed in the subject application, there is an advantage such that the visibility of the indicator may be improved.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus comprising:
  a chassis that is plate-like and has an internal space;
  a light source within the internal space;
  a light guiding member that is provided on a side surface of the chassis, a part thereof exposing outside the chassis, receives light generated by the light source, and emits light outside the chassis; and
  a shielding member that is formed on a surface of a first member of the chassis, protrudes from the surface toward an optical path, the chassis including the first member and a second member that are engaged to form the internal space, the optical path existing between the light source and the light guiding member, and shields the optical path, wherein
  the shielding member includes:
    a side shielding plate that extends along the optical path; and
    a back shielding plate that is provided on an opposite side of the light guiding member relative to the light source,
  the light source is mounted on a board, and
  the board extends from the light source toward the light guiding member.

2. The information processing apparatus according to claim 1, wherein
  the light source is laid over a communication device within the internal space in a thickness direction of the chassis,
  the communication device includes a communication unit on a side of a side surface of the board,
  a distance from the side surface to the light source is longer than a distance from the side surface to the communication unit, and
  the board has a circuit mounted at an area other than an area from the light source toward the light guiding member.

3. An information processing apparatus comprising:
  a chassis that is plate-like and has an internal space;
  a light source within the internal space;
  a light guiding member that is provided on a side surface of the chassis, a part thereof exposing outside the chassis, receives light generated by the light source, and emits light outside the chassis; and
  a shielding member that is formed on a surface of a first member of the chassis, protrudes from the surface toward an optical path, the chassis including the first member and a second member that are engaged to form the internal space, the optical path existing between the light source and the light guiding member, and shields the optical path,
  wherein the shielding member has an enclosing shape that protrudes from the surface of the first member of the chassis and that encloses the optical path.

4. The information processing apparatus according to claim 1, wherein the side shielding plate of the shielding member is in contact with the light guiding member.

* * * * *